US010108081B2

(12) United States Patent
Liu et al.

(10) Patent No.: US 10,108,081 B2
(45) Date of Patent: Oct. 23, 2018

(54) DISPLAY SCREEN

(71) Applicant: Rich Yard Investment Group Co., Ltd., Beijing (CN)

(72) Inventors: Jianjun Liu, Beijing (CN); Xiaobin Wu, Beijing (CN)

(73) Assignee: RICH YARD INVESTMENT GROUP CO., LTD., Beijing (CN)

(*) Notice: Subject to any disclaimer, the term of this patent is extended or adjusted under 35 U.S.C. 154(b) by 0 days.

(21) Appl. No.: 15/833,529

(22) Filed: Dec. 6, 2017

(65) Prior Publication Data

US 2018/0095354 A1 Apr. 5, 2018

Related U.S. Application Data

(63) Continuation of application No. PCT/CN2015/090633, filed on Sep. 25, 2015.

(30) Foreign Application Priority Data

Aug. 10, 2015 (CN) .......................... 2015 1 0487881
Aug. 10, 2015 (CN) ...................... 2015 2 0599458 U

(51) Int. Cl.
G03B 21/56 (2006.01)
(52) U.S. Cl.
CPC .................................... G03B 21/56 (2013.01)
(58) Field of Classification Search
CPC ............................... G03B 21/56; G03B 21/60
(Continued)

(56) References Cited

U.S. PATENT DOCUMENTS 4,597,633 A * 7/1986 Fussell ................... G03B 21/56
352/69
5,541,769 A * 7/1996 Ansley ................... G03B 21/56
359/443
(Continued)

FOREIGN PATENT DOCUMENTS

CN 203982069 12/2014
CN 105100759 11/2015
(Continued)

OTHER PUBLICATIONS

International Search Report and Written Opinion issued in International Application No. PCT/CN2015/090633 dated May 24, 2016 (6 pages).

Primary Examiner — Christopher Mahoney
(74) Attorney, Agent, or Firm — Hamre, Schumann, Mueller & Larson, P.C.

(57) ABSTRACT

Embodiments of the present application provide a display screen, wherein the display screen is in a fully-closed or partially-closed housing structure, an interior of the housing structure being configured to provide continuous images with a view angle of 180 degrees to 360 degrees in a horizontal direction; wherein the housing structure includes a cylindrical portion, a side wall of the cylindrical portion being arranged in a smooth arc line or straight line on an axial cross section, and if the side wall of the cylindrical portion is arranged in the arc line, the radius of a circle corresponding to the arc line is greater than a maximum vertical distance from the arc line to an axial line. According to the present application, the audiences feel comfortable in watching and the cost is saved, while a strong sense of immersion is achieved for the audiences.

8 Claims, 19 Drawing Sheets (a)

(c)

(b)

(d)

(58) Field of Classification Search
 USPC .......................................................... 359/451
 See application file for complete search history.

(56) References Cited

U.S. PATENT DOCUMENTS

| | | | | |
|---|---|---|---|---|
| 6,665,985 | B1* | 12/2003 | Hennes | E04H 3/22 |
| | | | | 352/69 |
| 8,054,547 | B2 | 11/2011 | Anderson et al. | |
| 8,992,336 | B2 | 3/2015 | Magpuri | |
| 2002/0171927 | A1* | 11/2002 | Barnes, III | G03B 21/00 |
| | | | | 359/451 |
| 2011/0157694 | A1* | 6/2011 | Ferren | G03B 21/56 |
| | | | | 359/445 |
| 2013/0308183 | A1* | 11/2013 | Vermeirsch | G03B 21/62 |
| | | | | 359/451 |

FOREIGN PATENT DOCUMENTS

| | | |
|---|---|---|
| CN | 204906591 | 12/2015 |
| CN | 105247415 | 1/2016 |
| CN | 205139560 | 4/2016 |
| JP | 2008107536 | 5/2008 |

\* cited by examiner

DISPLAY SCREEN

This application is based upon and claims priority to Chinese Patent Applications No. 201510487881.9 and No. 201520599458.3, filed before Chinese Patent Office on Aug. 10, 2015 and entitled "DISPLAY SCREEN" and "DISPLAY SCREEN", the entire contents of which are incorporated herein by reference.

TECHNICAL FIELD

The present application relates to the technical field of display, and in particular, relates to a display screen.

BACKGROUND

This part is intended to provide a background or context for the embodiments of the present application described in the claims. The description herein shall not be considered as the related art due to inclusion on this part.

As a development trend, human information propagation technologies are constantly reducing information entropy, such that the information entropy finally approaches zero, that is, the realistic world is reproduced as much as possible. Since presence of movies, display screens are continuously under revolution, advancement and evolution.

According to the shapes of the display screens, the display screens in the related art may be categorized into planar screens, circular screens, and dome screens. High Presence Display (ISBN: 7030110218 KuSenzoku from Japan) has disclosed that high presence is formed by the following factors: high definition, full color, three-dimensional, and no boundary. No boundary refers to that the ordinary audiences, in the normal visual field range, fail to see the boundary between the image displayed on the display screen and the realistic world, that is, fail to see the boundary on the display screen, such that the audiences have a strong sense of immersion. The planar screen, the circular screen and the dome screen achieve the effects of high definition, full color and three-dimensional. However, in practice, the planar screen and the circular screen may not be made infinitely large, and may not enclose the audiences. Therefore, the planar screen and the circular screen may not be made to have no boundary. The dome screen is capable of better enclosing the audiences, and the audiences may not see the boundary on the display screen in the normal visual range. Therefore, only the dome screen may be made to have no boundary and achieve the objective of creating a strong sense of immersion for the audiences.

At present, many patent documents regarding the dome screen technology have been published. For example, U.S. Pat. No. 8,054,547 B2 (authorized on Nov. 8, 2011) has disclosed a seamless, non-shaded rear projection dome display system, wherein the system includes a 360-degree display screen spliced by a plurality of translucent screens, and the spliced display screen is in a dome shape, that is, a partially-dome screen shape. This display screen is hard to be built, and needs a high economy, time and labor cost.

Still for example, U.S. Pat. No.8,992,336 B2 (authorized on Mar. 31, 2015) has disclosed a cinematic theater structure, wherein the cinematic theater structure includes a dome-shaped screen, that is, a partially dome screen, the screen may include a dome head or includes no dome head, and the dome-shaped screen surrounds the seats of the audiences.

The dome screen mentioned in the related art includes the dome screen in the above patent documents. Although the dome screen has the advantages of creating a strong sense of immersion for the audiences, in practice, since the seats of the audiences are arranged in a plurality of rows, the audiences seated on two sides of the theater far away from the middle seats would see a high inclination of the dome screen in a horizontal direction, which is not a normal view angle for the human eyes. As a result, the audiences may feel uncomfortable. To make the audiences seated on the sides watch comfortably, the dome screen needs to have a larger radius. Consequently, the manufacturing cost of the dome screen is high.

SUMMARY

To solve one of the above technical problems, the present application provides a display screen, which increases the sense of immersion of the audience and improves comfort of the audience, and occupies a smaller installation space.

Embodiments of the present application provide a display screen, wherein the display screen is in a fully-closed or partially-closed housing structure, an interior of the housing structure being configured to provide continuous images with a view angle of 180 degrees to 360 degrees in a horizontal direction; wherein the housing structure includes a cylindrical portion, a side wall of the cylindrical portion being arranged in a smooth arc line or straight line on an axial cross section, and if the side wall of the cylindrical portion is arranged in the arc line, the radius of a circle corresponding to the arc line is greater than a maximum vertical distance from the arc line and to an axial line.

In an embodiment of the present application, the cross section of the cylindrical portion comprises a circle, an ellipse, an unsymmetrical circle, or a quadrangle with rounded corners.

In an embodiment of the present application, when the cross section of the cylindrical portion is a quadrangle with rounded corners, the quadrangle rectangular.

In an embodiment of the present application, the housing structure further comprises one or two end portions;

wherein when the housing structure includes one end portion, the end portion is connected to one end of the cylindrical portion in a smooth transition manner; or wherein when the housing structure includes two end portions, the two end portions are respectively connected to two ends of the cylindrical portion in a smooth transition manner.

In an embodiment of the present application, the cylindrical portion is integratable with or detachable from the end portion.

In an embodiment of the present application, if the side wall of the cylindrical portion is arranged in a straight line on the axial cross section and the cross section of the cylindrical portion is a circle, the end portion is a semi-spherical structure.

In an embodiment of the present application, the housing structure is an ellipsoid structure.

In an embodiment of the present application, the cross section of the ellipsoid structure is a circle or an ellipse.

In an embodiment of the present application, the display screen includes a self-luminous display screen or a projection display screen.

In an embodiment of the present application, the display screen is configured to display a planar image or a three-dimensional image.

BRIEF DESCRIPTION OF THE DRAWINGS

To describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein without any creative effort.

DETAILED DESCRIPTION

Figure 1:
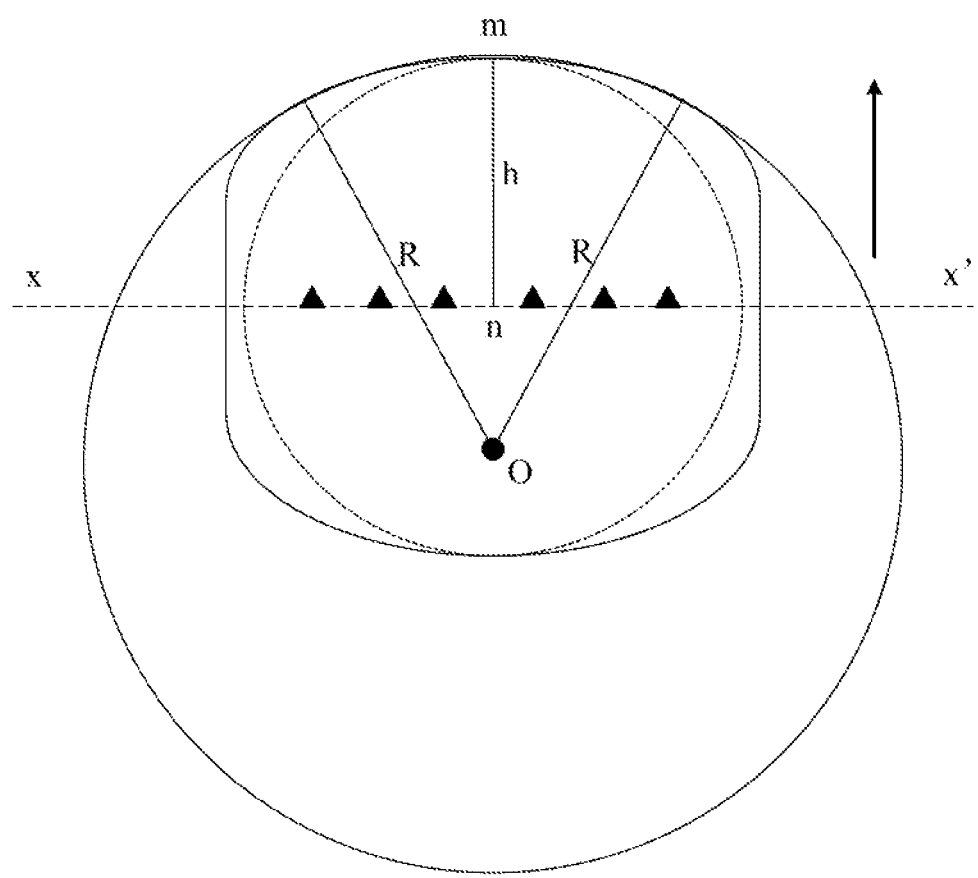
FIG. 1 is a schematic view of an axial cross section of a cylindrical portion of a display screen according to an embodiment of the present application.

To make a person skilled in the art better understand the technical solutions of the present application, the technical solutions in the embodiments of the present application are described clearly and completely with reference to the accompanying drawings in the embodiments of the present application. Apparently, the described embodiments are merely some of rather than all of the embodiments of the present application. Based on the embodiments of the present application, all other embodiments derived by persons of ordinary skill in the art without any creative efforts shall fall within the protection scope of the present application.

A conventional display screen includes a planar screen, a circular screen and a dome screen. The planar screen refers to a screen which is a plane and typically in a rectangular shape. The circular screen refers to a circular-shape screen which has a specific height. The dome screen refers to a screen which is in a standard ball-shape. In practice, in consideration of the cost, the length and width of the planar screen, and the height of the circular screen may not be made infinitely large. Therefore, the audience may see the boundary between an image displayed on the display screen and a realistic world. The dome screen may fully enclose or partially enclose the audiences, and thus the audiences may not see the boundary between the image displayed on the dome screen and the realistic world in the visual field, and the audiences feel like being seated in the world presented by the image played on the dome screen. In this way, the audiences achieve a very strong sense of immersion.

However, the inventors have found that under common circumstances, the seats of the audiences are arranged in a plurality of rows, the central seats are generally close to or located at the center portion of the dome screen, the audiences seated in the central seats may horizontally watch a symmetrical dome screen and thus have high comfort, whereas the audiences seated far away from the central seats horizontally watch a greatly-inclined screen and thus have low comfort. If the comfort of the audiences seated far away from the central seats is to be ensured, the diameter of the dome screen needs to be sufficiently great, and thus the project cost is typically high.

To solve the above technical problem, an embodiment of the present application provides a display screen. The display screen is in a fully-enclosed or partially-enclosed housing structure. An interior of the housing structure is configured to provide continuous images with a view angle of 180 degrees to 360 degrees in a horizontal direction.

The housing structure includes a cylindrical portion, wherein a side wall of the cylindrical portion is arranged in a smooth arc line or straight line on an axial cross section, and if the side wall of the cylindrical portion is arranged in the arc line, the radius of a circle corresponding to the arc line is greater than a maximum vertical distance from the arc line to an axial line.

The basic principles of the technical solution according to this embodiment are described hereinafter.

Referring to FIG. 1, FIG. 1 is a schematic view of an axial cross section of the cylindrical portion of the display screen according to this embodiment. The dotted line xx' represents an axial line of the cylindrical portion, and the side wall of the cylindrical portion is arranged in the smooth arc line on the axial cross section, and the circle corresponding to the arc line has a center point O and a radius R. The maximum distance from the arc line to the axial line xx' is h.

In FIG. 1, the dotted-line circle formed with n being the center point and H being the radius thereof represents the axial cross section of the dome screen. When the audiences (represented by the small black triangle) watch the screen along a horizontal forward direction (the direction indicated by the arrow), if the height h is fixed, in this embodiment, since the radius R of the circle corresponding to the arc line of the cylindrical portion is greater than h, the radian of the arc line is less than the radian of the arc line of the dome screen with h being the radius. In this way, the eye comfort of the audiences when watching the screen is improved, especially for the audiences seated far away from the central seats.

If the radian of the dome screen needs to be the same as the radian of the cylindrical portion to ensure the comfort of the audiences when watching the screen, a dome screen with the radius R (represented by the solid-line circle) needs to be constructed. As seen from FIG. 1, the area of the circle with the radius R is greater than the area of the cross section of the cylindrical portion. Therefore, if the dome screen with the radius R is constructed, the volume of the cylindrical portion may be less than the volume of the dome screen. In this case, the display screen according to this embodiment further effectively saves the manufacturing cost.

FIG. 1 depicts that the side wall of the cylindrical portion is arranged in the arc line on the axial cross section according to this embodiment. In practice, the side wall of the cylindrical portion may also be arranged in a straight line on the axial cross section. In this case, on the same axial cross section, the distances from all the points on the side wall of the cylindrical portion to the axial line of the cylindrical portion are the same. That is, for the audiences seated in the same row, they have the same comfort when they watch the screen towards the forward direction, and they achieve the maximum comfort in the horizontal direction. However, the dome screen fails to achieve such comfort. This is because if the radian of the dome screen is to be approximate to the radian of the straight line, the diameter of the dome screen needs to be infinitely large, which is impossible in practice. Relative to the some screen having an infinitely large volume, the display screen according to this embodiment has an even smaller volume, which saves the manufacturing cost.

In this embodiment, the display screen is in a housing structure, wherein the housing structure may be a fully-enclosed structure or a partially-enclosed structure. Hereinafter several fully-enclosed display screen embodiments are firstly described. When the housing structure is a fully-enclosed structure, the housing structure includes two end portions configured to enclose the cylindrical portion, wherein the two end portions are connected to the cylindrical portion in a smooth transition manner. The end portions may also be integratable with or detachable from the cylindrical portion.

In this embodiment illustrating the fully-enclosed display screen, various embodiments in which the side wall of the cylindrical portion is arranged in a straight line on the axial cross section is arranged are described firstly.

Figure 2:
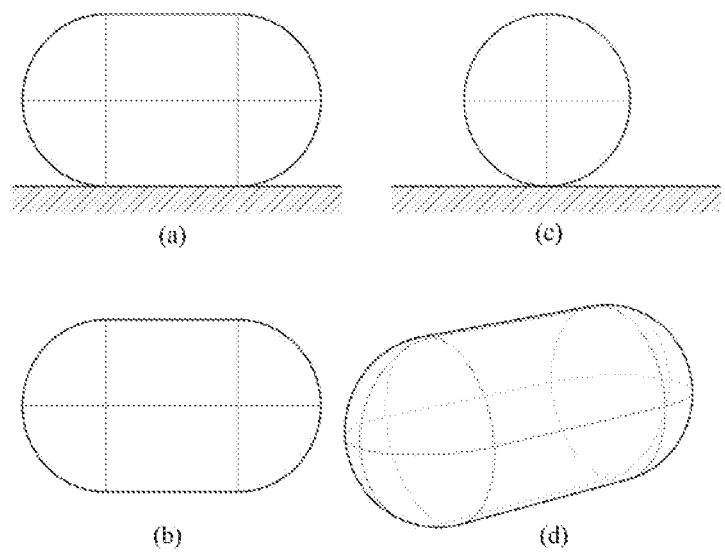
FIG. 2 is a schematic view of a fully-enclosed display screen whose cylindrical portion has a circular cross section according to an embodiment of the present application.

In an embodiment, referring to FIG. 2, FIG. 2(a) is a front view of the display screen (the slanted line represents the ground, and the same applies analogously hereinafter), FIG. 2(b) is a top view of the display screen, FIG. 2(c) is a left (or right) view of the display screen, and FIG. 2(d) is a three dimensional view of the display screen. As seen from the four pictures in FIG. 2, the cross section of the cylindrical portion of the display screen is a circle, the two end portions are in a semispherical shape, and the entire housing structure is similar to a capsule shape.

The present application sets no limitation to the specific value of the radius of the circle, and a person skilled in the art may customize the radius according to actual needs.

Figure 3:
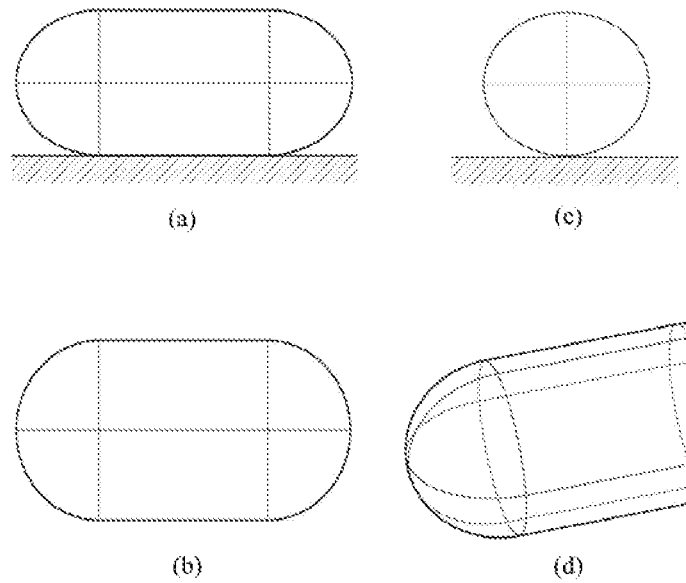
FIG. 3 is a schematic view of a fully-enclosed display screen whose cylindrical portion has an elliptical cross section according to an embodiment of the present application.

In another embodiment, referring to FIG. 3, FIG. 3(a) is a front view of the display screen, FIG. 3(b) is a top view of the display screen, FIG. 3(c) is a left (or right) view of the display screen, and FIG. 3(d) is a three dimensional view of the display screen. As seen from the four pictures in FIG. 3, the cross section of the cylindrical portion of the display screen is an elliptical shape. The present application either sets no limitation to the specific value of the long axis and the short axis or sets no limitation to the ratio of the long axis to the short axis, and a person skilled in the art may customize the two axes and the ratio of the long axis to the short axis.

Figure 4:
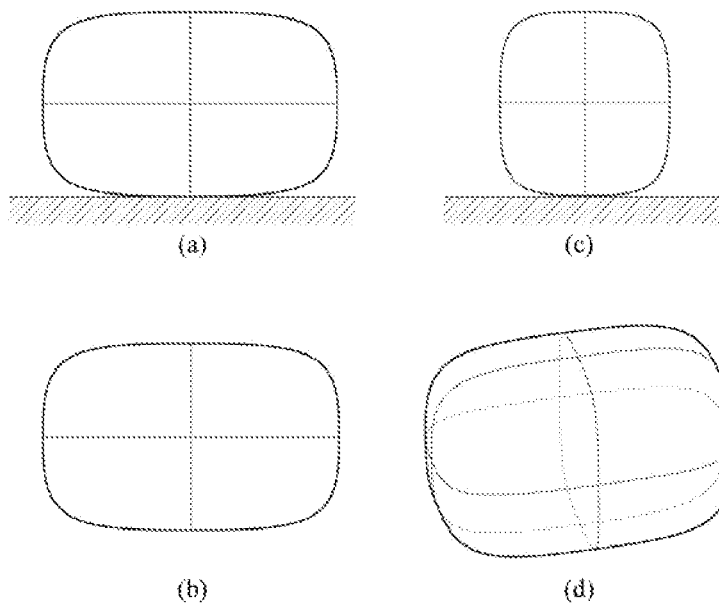
FIG. 4 is a schematic view of a fully-enclosed display screen whose cylindrical portion has a square cross section with rounded corners according to an embodiment of the present application.

In another embodiment, referring to FIG. 4, FIG. 4(a) is a front view of the display screen, FIG. 4(b) is a top view of the display screen, FIG. 4(c) is a left (or right) view of the display screen, and FIG. 4(d) is a three dimensional view of the display screen. As seen from the four pictures in FIG. 4, the cross section of the cylindrical portion of the display screen is a square with rounded corners. Nevertheless, in practice, the cross section of the cylindrical portion may also be a rectangular with rounded corners or other quadrangles. Configuration of the rounded corners is to ensure a smooth transition to the two end portions. The present application either sets no limitation to the specific values of the lengths of the sides of the quadrangle or sets no limitation to the radius r of the rounded corners, and a person skilled in the art may customize the specific values of the side lengths and the radius of the rounded corners according to actual needs.

Figure 5:
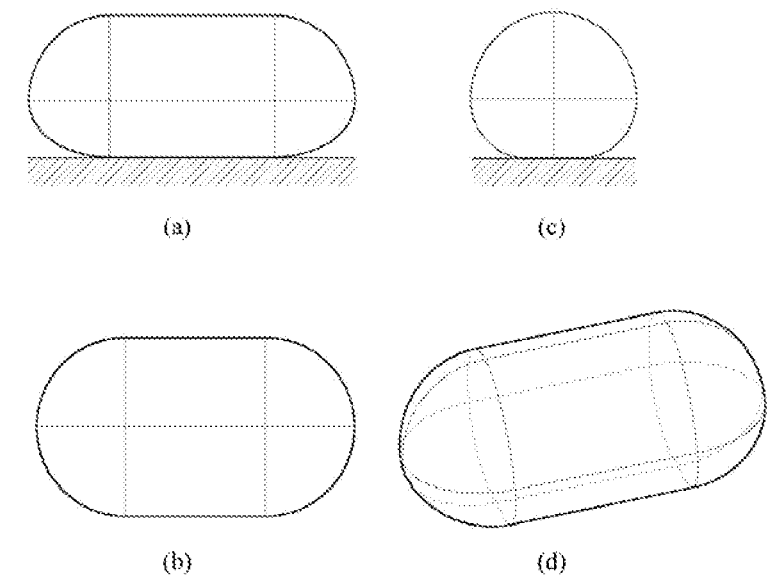
FIG. 5 is a schematic view of a fully-enclosed display screen whose cylindrical portion has a top-bottom unsymmetrical cross section according to an embodiment of the present application.

In another embodiment, referring to FIG. 5, FIG. 5(a) is a front view of the display screen, FIG. 5(b) is a top view of the display screen, FIG. 5(c) is a left (or right) view of the display screen, and FIG. 5(d) is a three dimensional view of the display screen. As seen from the four pictures in FIG. 5, the cross section of the cylindrical portion of the display screen is a top-bottom unsymmetrical circle. Nevertheless, in practice, the cross section of the cylindrical portion may be a left-right unsymmetrical circle. The present application sets no limitation to the specific parameters of the unsymmetrical circle, and a person skilled in the art may customize the specific parameters of the unsymmetrical circle according to actual needs.

FIG. 2 to FIG. 5 illustrate the embodiments in which the side wall of the cylindrical portion is arranged in the straight line in the axial cross section. It may be understood that the above embodiments construe no limitation to the present application, and any embodiment in which the side wall of the cylindrical portion is arranged in the straight line on the axial cross section falls within the protection scope of the present application. In addition, the embodiments as illustrated in FIG. 2 to FIG. 5 are the same in that the side wall of the cylindrical portion is arranged in the straight line on the axial cross section, but are different in that the cylindrical portions have different cross sections, some of which have a great radian whereas some of which have a small radian. For the audiences, a smaller radian of the cross section indicates a more comfortable watching experience; and on the contrary, a larger radian of the cross section indicates a less comfortable watching experience. Therefore, in the above four embodiments, the display screen whose cross section is a quadrangle with rounded corners has an optimal visual effect.

Hereinafter various embodiments in which the side wall of the cylindrical portion is arranged in the arc line shape on the axial cross section when the display screen is a fully-enclosed display screen are described.

Figure 6:
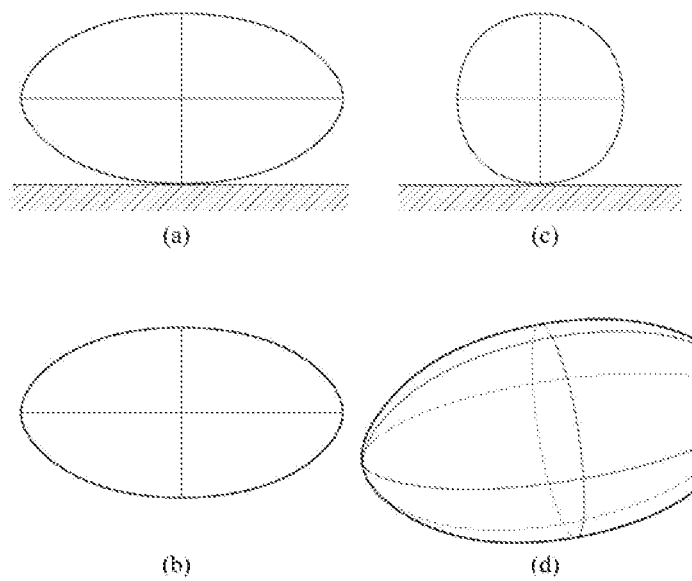
FIG. 6 is a schematic view of a fully-enclosed display screen whose housing structure is an integral ellipsoid having a circular cross section according to an embodiment of the present application.

In one embodiment, referring to FIG. 6, FIG. 6(a) is a front view of the display screen, FIG. 6(b) is a top view of the display screen, FIG. 6(c) is a left (or right) view of the display screen, and FIG. 6(d) is a three dimensional view of the display screen. As seen from the four pictures in FIG. 6, the entire housing structure of the display screen is an ellipsoid, and the ellipsoid has a circular cross section. The present application sets no limitation to the specific parameters of the ellipsoid in FIG. 6, and a person skilled in the art may customize the specific parameters of the ellipsoid according to actual needs.

Figure 7:
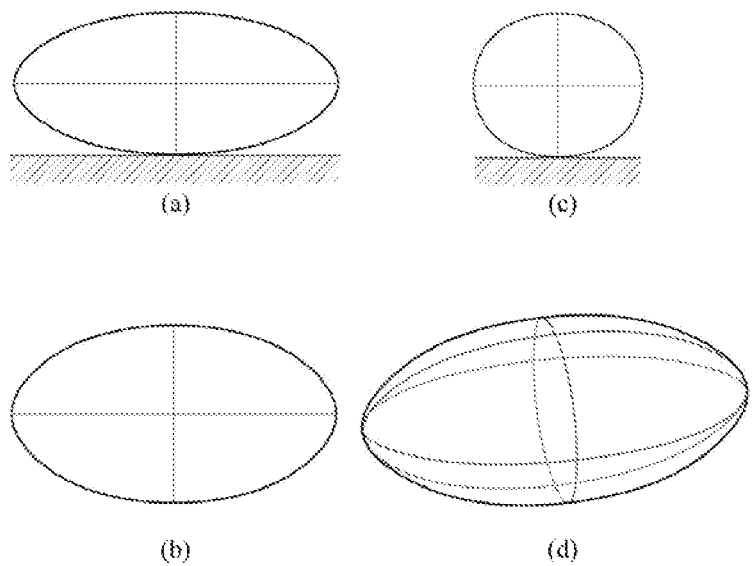
FIG. 7 is a schematic view of a fully-enclosed display screen whose housing structure is an integral ellipsoid having an elliptical cross section according to an embodiment of the present application.

In another embodiment, referring to FIG. 7. FIG. 7(a) is a front view of the display screen, FIG. 7(b) is a top view of the display screen, FIG. 7(c) is a left (or right) view of the display screen, and FIG. 7(d) is a three dimensional view of the display screen. Like the display screen in FIG. 6, the entire housing structure of the display screen in FIG. 7 is also an ellipsoid. However, the ellipsoid has an elliptical cross section. The present application sets no limitation to the specific parameters of the ellipsoid in FIG. 7, and a person skilled in the art may customize the specific parameters of the ellipsoid according to actual needs.

Nevertheless, it may be understood that in the two embodiments as illustrated in FIG. 6 and FIG. 7, the side wall of the cylindrical portion is arranged in the arc line shape on the axial cross section; and when the side wall of the cylindrical portion is arranged in the arc line shape on the axial cross section, the cross section of the cylindrical portion may be an unsymmetrical circle, a quadrangle with rounded corners or the like. It should be noted that the arrangement of the side wall of the cylindrical portion in the arc line or straight line on the axial cross section does not necessarily signify that all the side walls of the cylindrical portion are arranged in one line shape on the axial cross section. Instead, a portion of the side walls may be arranged in the straight line shape and a portion of the side walls may be arranged in the arc line shape. For example, the side walls of the display screen facing towards the audiences are arranged in the straight line shape, whereas the side walls of the display screen on the top of the audiences are arranged in the arc line shape.

The above embodiments describe the display screen having a fully-enclosed housing structure. The fully-enclosed display screen is advantageous in that the audiences are capable of watching displayed images over 360 degrees, and the audiences have a good non-boundary experience. However, the cost is high. To save the cost, in practice, the display screen may employ a partially-enclosed housing structure. Hereinafter various embodiments in which the display screen having a partially-enclosed housing structure are described. In practice, since the audiences generally would not watch the displayed images towards the bottom of the seats, the bottom portion of the display screen may be "cut".

Figure 8:
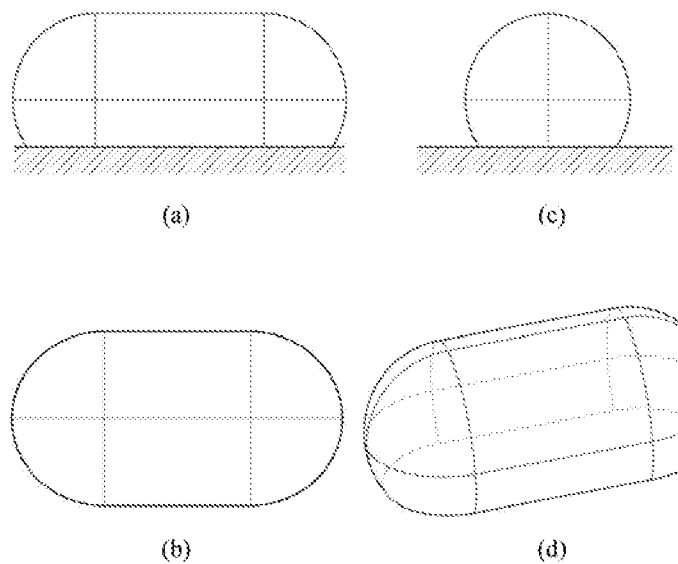
FIG. 8 is a schematic view of a partially-enclosed display screen with a bottom portion being "cut" corresponding to FIG. 2 according to an embodiment of the present application.

In one embodiment, referring to FIG. 8, FIG. 8 illustrates a display screen in FIG. 2 with a bottom portion being "cut". FIG. 8(a) is a front view of the display screen, FIG. 8(b) is a top view of the display screen, FIG. 8(c) is a left (or right) view of the display screen, and FIG. 8(d) is a three-dimensional view of the display screen.

Figure 9:
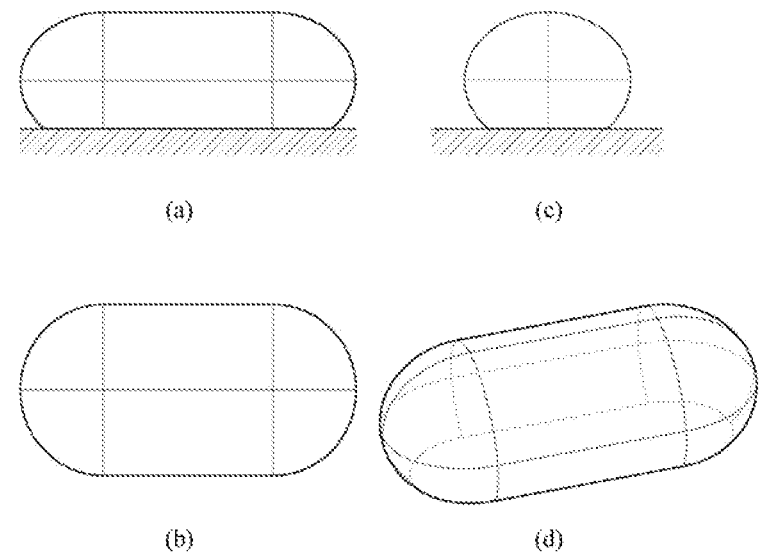
FIG. 9 is a schematic view of a partially-enclosed display screen with a bottom portion being "cut" corresponding to FIG. 3 according to an embodiment of the present application.

In another embodiment, referring to FIG. 9, FIG. 9 illustrates a display screen in FIG. 3 with a bottom portion being "cut". FIG. 9(a) is a front view of the display screen, FIG. 9(b) is a top view of the display screen, FIG. 9(c) is a left (or right) view of the display screen, and FIG. 9(d) is a three-dimensional view of the display screen.

Figure 10:
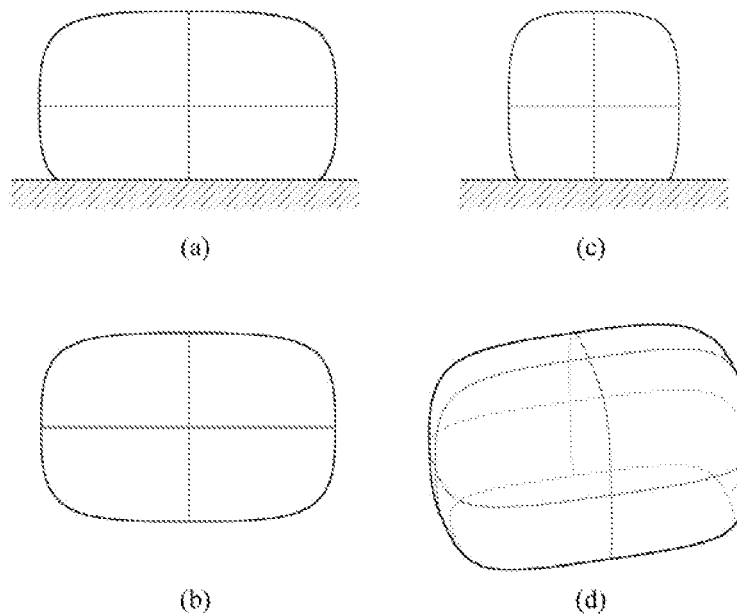
FIG. 10 is a schematic view of a partially-enclosed display screen with a bottom portion being "cut" corresponding to FIG. 4 according to an embodiment of the present application.

In another embodiment, referring to FIG. 10, FIG. 10 illustrates a display screen in FIG. 4 with a bottom portion being "cut". FIG. 10(a) is a front view of the display screen, FIG. 10(b) is a top view of the display screen, FIG. 10(c) is a left (or right) view of the display screen, and FIG. 10(d) is a three-dimensional view of the display screen.

Figure 11:
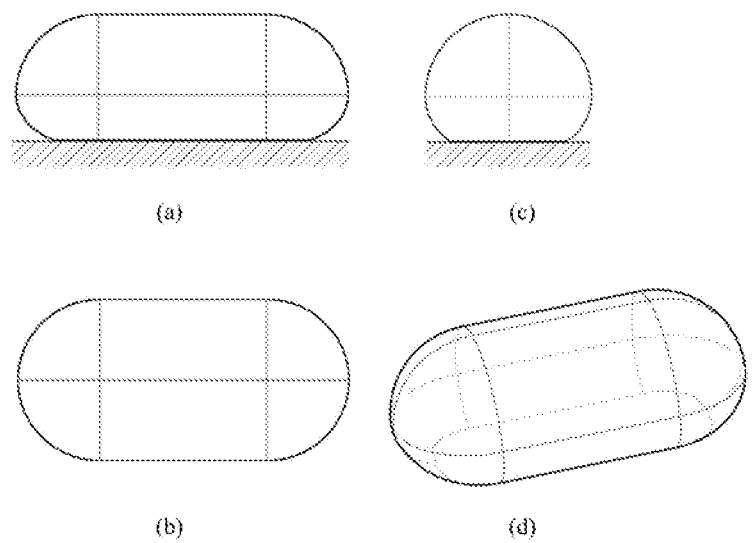
FIG. 11 is a schematic view of a partially-enclosed display screen with a bottom portion being "cut" corresponding to FIG. 5 according to an embodiment of the present application.

In another embodiment, referring to FIG. 11, FIG. 11 illustrates a display screen in FIG. 5 with a bottom portion being "cut". FIG. 11(a) is a front view of the display screen, FIG. 11(b) is a top view of the display screen, FIG. 11(c) is a left (or right) view of the display screen. and FIG. 11(d) is a three-dimensional view of the display screen.

Figure 12:
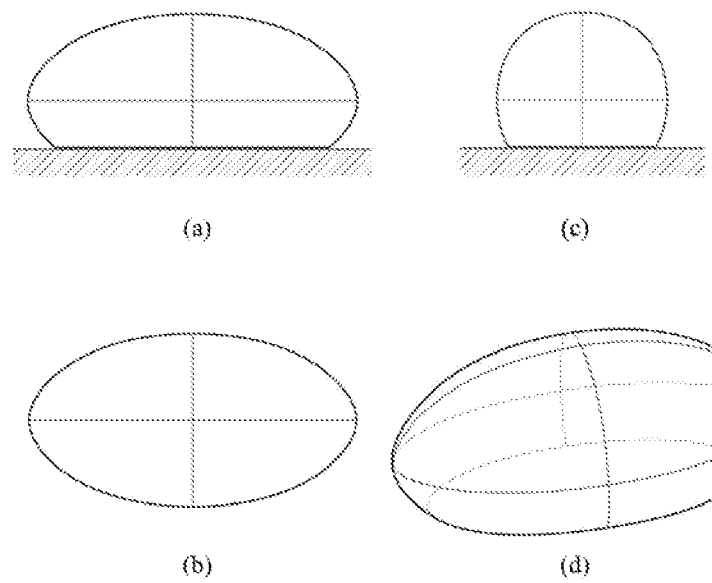
FIG. 12 is a schematic view of a partially-enclosed display screen with a bottom portion being "cut" corresponding to FIG. 6 according to an embodiment of the present application.

In another embodiment, referring to FIG. 12, FIG. 12 illustrates a display screen in FIG. 6 with a bottom portion being "cut". FIG. 12(a) is a front view of the display screen, FIG. 12(b) is a top view of the display screen, FIG. 12(c) is a left (or right) view of the display screen, and FIG. 12(d) is a three-dimensional view of the display screen.

Figure 13:
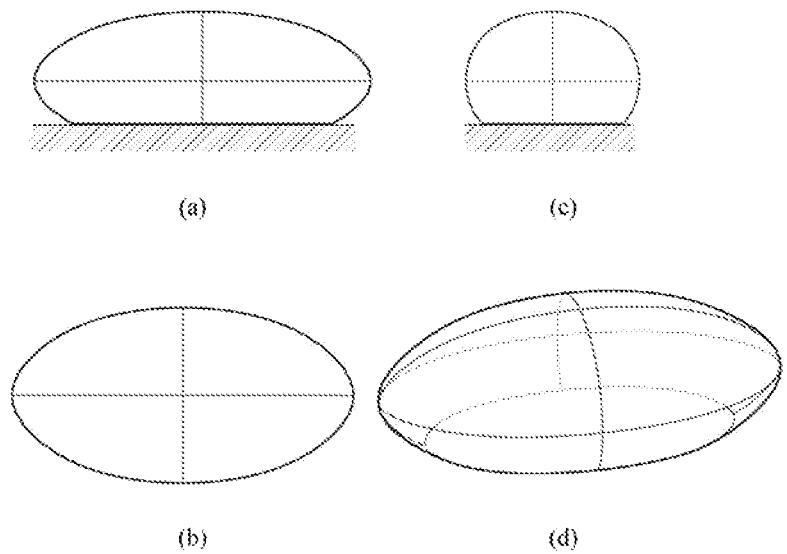
FIG. 13 is a schematic view of a partially-enclosed display screen with a bottom portion being "cut" corresponding to FIG. 7 according to an embodiment of the present application.

In another embodiment, referring to FIG. 13, FIG. 13 illustrates a display screen in FIG. 7 with a bottom portion being "cut". FIG. 13(a) is a front view of the display screen, FIG. 13(b) is a top view of the display screen. FIG. 13(c) is a left (or right) view of the display screen, and FIG. 13(d) is a three-dimensional view of the display screen.

The present application sets no limitation to the specifically "cut" portion of the display screen, that is, the degree of the "opening" of the housing structure. In practice, the portion to be cut may be determined according to the size and position of the seat platform of the audiences, the size of the display screen and the like, as long as the audiences are capable of normally watching the display images in the vertical direction and achieving the sense of no boundary. Preferably, it needs to be at least ensured that the audiences in the first row are capable of watching the display screen from the lowermost part in the sight line when the audiences watching from a front elevation. Generally, the lower boundary of the vertical vision field of the eyes of the audiences is 70 degrees below the eye level.

In practice, since the audiences generally would not watch the displayed images towards the rear portion of the seats, the rear portion of the display screen may be "cut".

Figure 14:
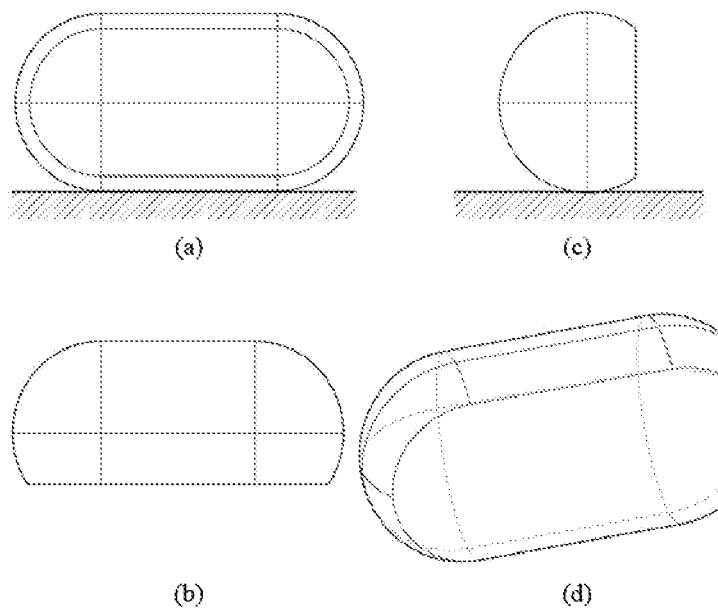
FIG. 14 is a schematic view of a partially-enclosed display screen with a rear portion being "cut" corresponding to FIG. 2 according to an embodiment of the present application.

In one embodiment, referring to FIG. 14, FIG. 14 illustrates a display screen in FIG. 2 with a rear portion being "cut". FIG. 14(a) is a front view of the display screen, FIG. 14(b) is a top view of the display screen, FIG. 14(c) is a left (or right) view of the display screen, and FIG. 14(d) is a three-dimensional view of the display screen.

Figure 15:
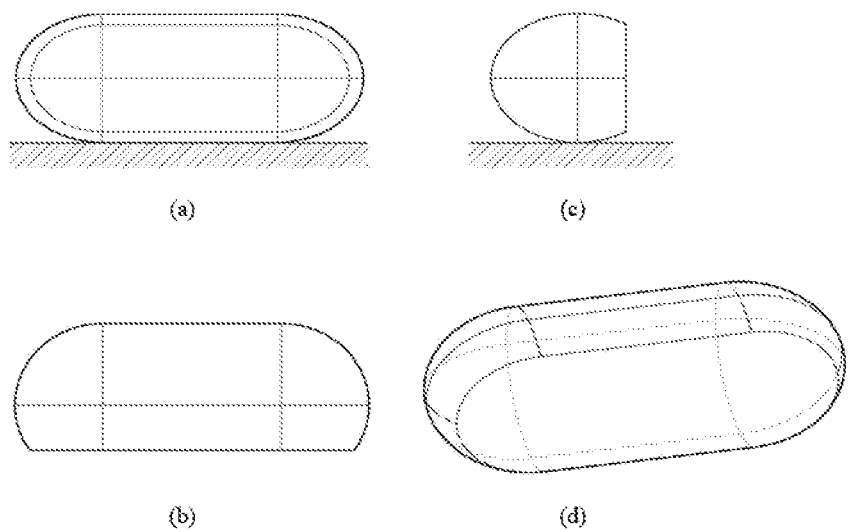
FIG. 15 is a schematic view of a partially-enclosed display screen with a rear portion being "cut" corresponding to FIG. 3 according to an embodiment of the present application.

In another embodiment, referring to FIG. 15, FIG. 15 illustrates a display screen in FIG. 3 with a rear portion being "cut". FIG. 15(a) is a front view of the display screen, FIG. 15(b) is a top view of the display screen, FIG. 15(c) is a left (or right) view of the display screen, and FIG. 15(d) is a three-dimensional view of the display screen.

Figure 16:
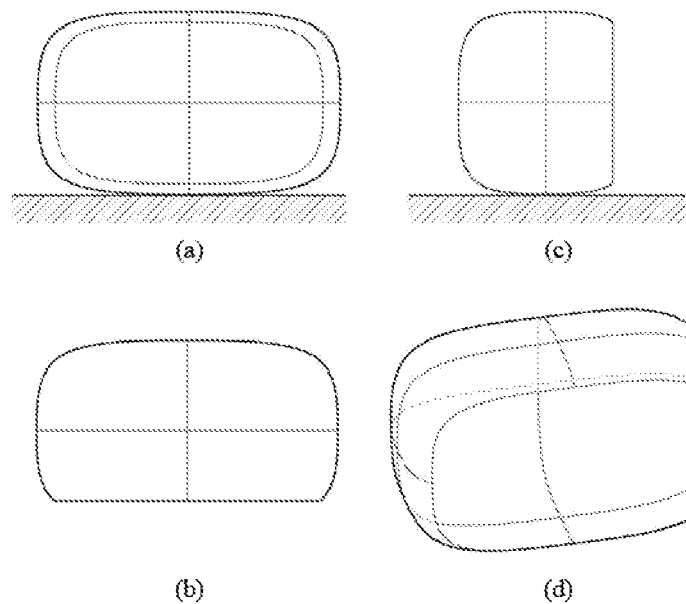
FIG. 16 is a schematic view of a partially-enclosed display screen with a rear portion being "cut" corresponding to FIG. 4 according to an embodiment of the present application.

In another embodiment, referring to FIG. 16, FIG. 16 illustrates a display screen in FIG. 4 with a rear portion being "cut". FIG. 16(a) is a front view of the display screen, FIG. 16(b) is a top view of the display screen, FIG. 16(c) is a left (or right) view of the display screen, and FIG. 16(d) is a three-dimensional view of the display screen.

Figure 17:
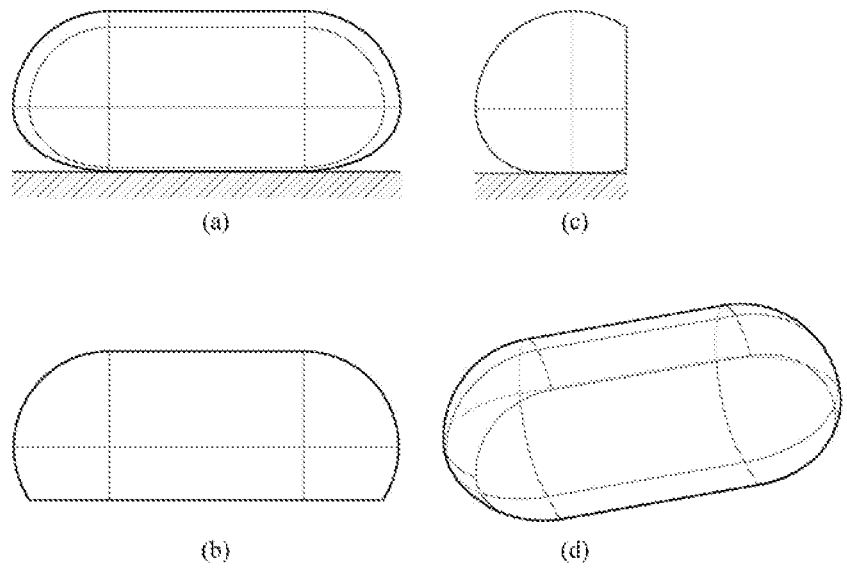
FIG. 17 is a schematic view of a partially-enclosed display screen with a rear portion being "cut" corresponding to FIG. 5 according to an embodiment of the present application.

In another embodiment, referring to FIG. 17, FIG. 17 illustrates a display screen in FIG. 5 with a rear portion being "cut". FIG. 17(a) is a front view of the display screen, FIG. 17(b) is a top view of the display screen. FIG. 17(c) is a left (or right) view of the display screen, and FIG. 17(d) is a three-dimensional view of the display screen.

Figure 18:
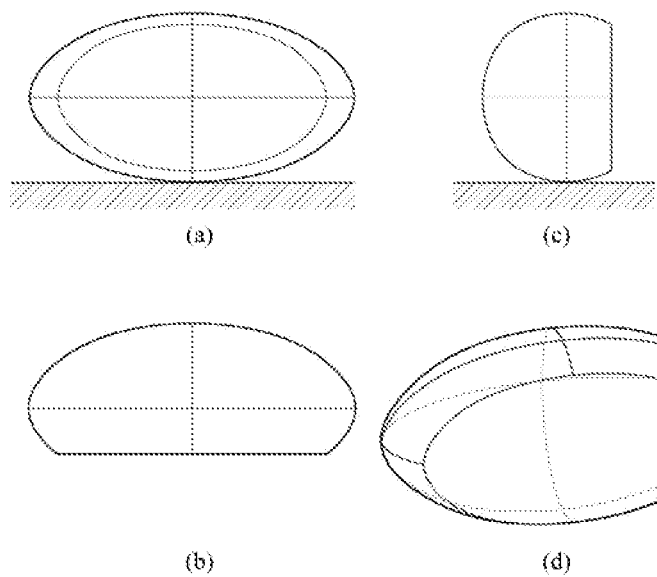
FIG. 18 is a schematic view of a partially-enclosed display screen with a rear portion being "cut" corresponding to FIG. 6 according to an embodiment of the present application.

In another embodiment, referring to FIG. 18, FIG. 18 illustrates a display screen in FIG. 6 with a rear portion being "cut". FIG. 18(a) is a front view of the display screen, FIG. 18(b) is a top view of the display screen, FIG. 18(c) is a left (or right) view of the display screen, and FIG. 18(d) is a three-dimensional view of the display screen.

Figure 19:
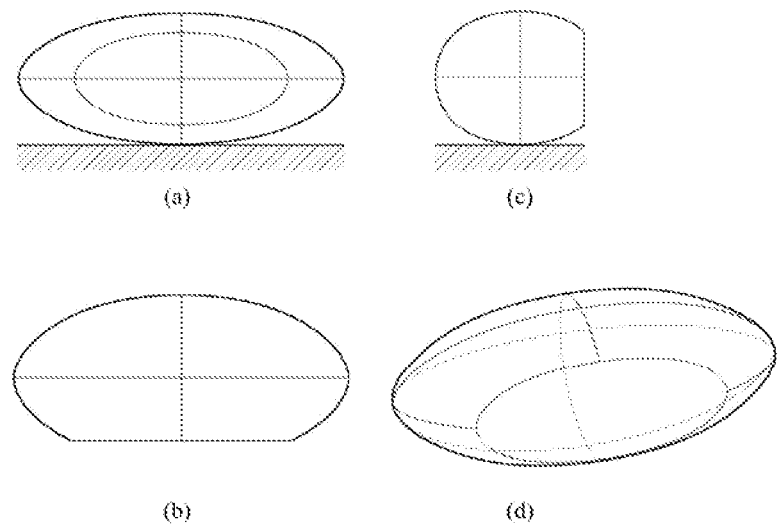
FIG. 19 is a schematic view of a partially-enclosed display screen with a rear portion being "cut" corresponding to FIG. 7 according to an embodiment of the present application.

In another embodiment, referring to FIG. 19, FIG. 19 illustrates a display screen in FIG. 7 with a rear portion being "cut". FIG. 19(a) is a front view of the display screen, FIG. 19(b) is a top view of the display screen, FIG. 19(c) is a left (or right) view of the display screen, and FIG. 19(d) is a three-dimensional view of the display screen. The present application sets no limitation to the specifically "cut" rear portion of the display screen, that is, the degree of the "opening" of the housing structure. In practice, the portion to be cut may be determined according to the size and positions of the seats of the audiences, the size of the display screen and the like, as long as the audiences are capable of normally watching the display images and achieving the sense of no boundary. Preferably, it needs to be at least ensured that the audiences in the first row are capable of watching the display screen from the uppermost part in the sight line when the audiences watching from a front elevation. Generally, the upper boundary of the vertical vision field of the eyes of the audiences is 50 degrees above the eye level.

In practice, to save the cost, the bottom portion and the rear portion of the display screen may be both "cut".

Figure 20:
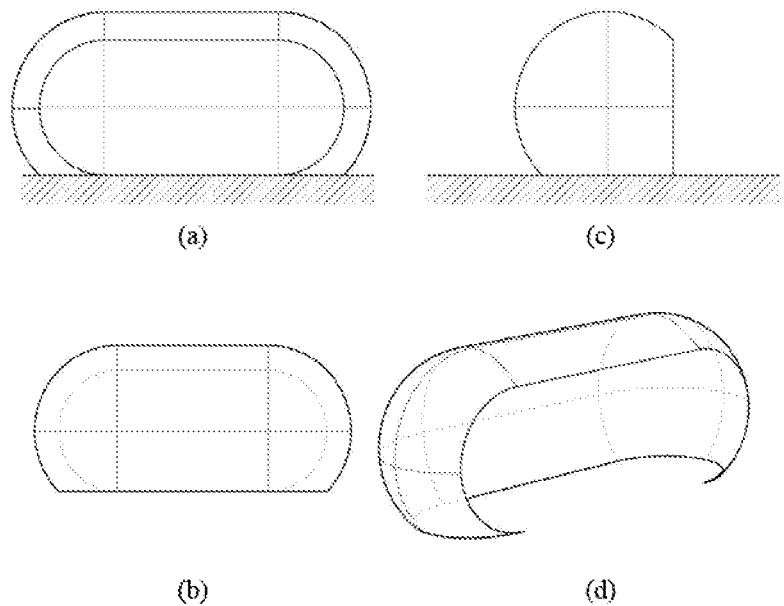
FIG. 20 is a schematic view of a partially-enclosed display screen with a bottom portion and a rear portion being both "cut" corresponding to FIG. 2 according to an embodiment of the present application.

In one embodiment, referring to FIG. 20, FIG. 20 illustrates a display screen in FIG. 2 with a bottom portion and a rear portion being both "cut". FIG. 20(a) is a front view of the display screen, FIG. 20(b) is a top view of the display screen, FIG. 20(c) is a left (or right) view of the display screen, and FIG. 20(d) is a three-dimensional view of the display screen.

Figure 21:
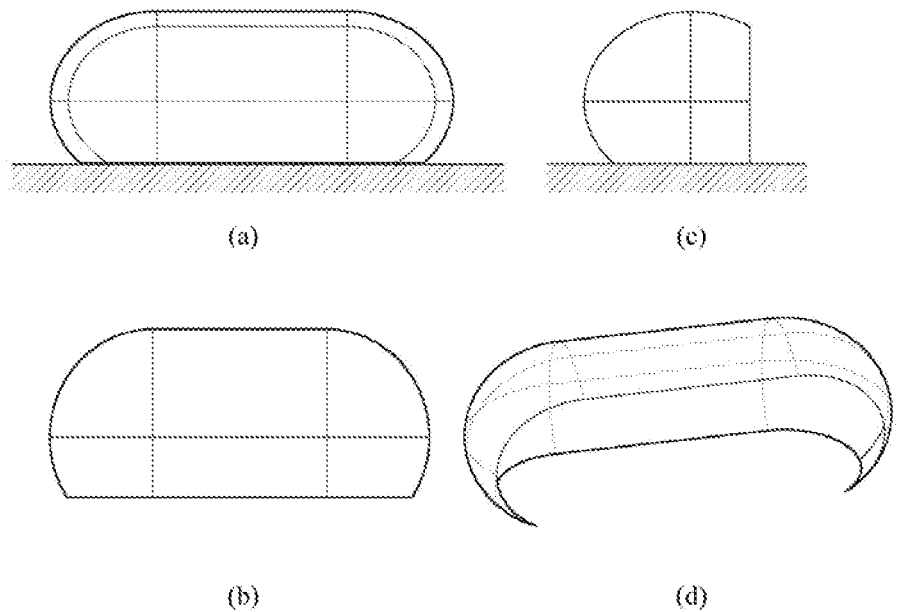
FIG. 21 is a schematic view of a partially-enclosed display screen with a bottom portion and a rear portion being both "cut" corresponding to FIG. 3 according to an embodiment of the present application.

In another embodiment, referring to FIG. 21, FIG. 21 illustrates a display screen in FIG. 3 with a bottom portion and a rear portion being both "cut". FIG. 21(a) is a front view of the display screen, FIG. 21(b) is a top view of the display screen, FIG. 21(c) is a left (or right) view of the display screen, and FIG. 21(d) is a three-dimensional view of the display screen.

Figure 22:
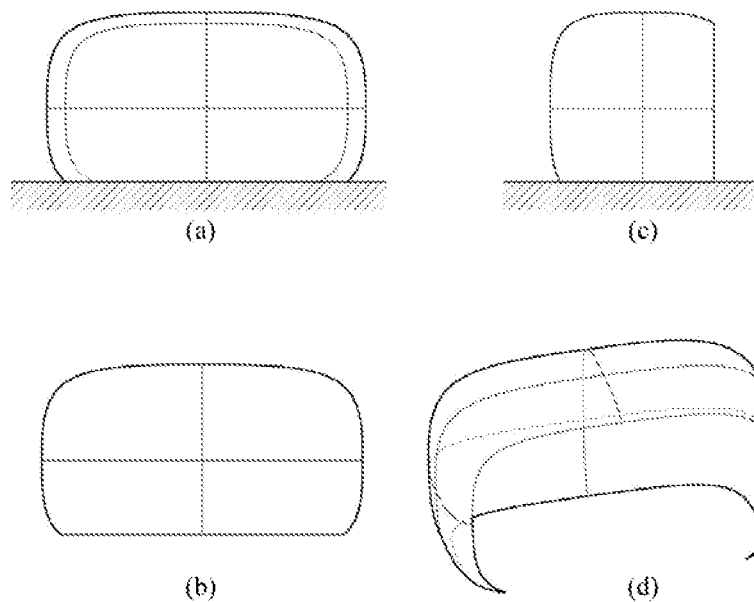
FIG. 22 is a schematic view of a partially-enclosed display screen with a bottom portion and a rear portion being both "cut" corresponding to FIG. 4 according to an embodiment of the present application.

In another embodiment, referring to FIG. 22, FIG. 22 illustrates a display screen in FIG. 4 with a bottom portion and a rear portion being both "cut". FIG. 22(a) is a front view of the display screen, FIG. 22(b) is a top view of the display screen, FIG. 22(c) is a left (or right) view of the display screen, and FIG. 22(d) is a three-dimensional view of the display screen.

Figure 23:
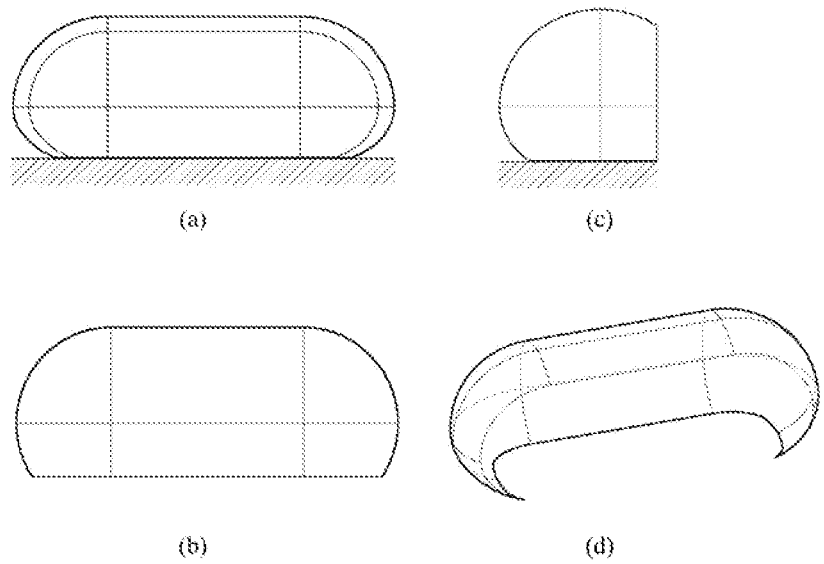
FIG. 23 is a schematic view of a partially-enclosed display screen with a bottom portion and a rear portion being both "cut" corresponding to FIG. 5 according to an embodiment of the present application.

In another embodiment, referring to FIG. 23, FIG. 23 illustrates a display screen in FIG. 5 with a bottom portion and a rear portion being both "cut". FIG. 23(a) is a front view of the display screen, FIG. 23(b) is a top view of the display screen, FIG. 23(c) is a left (or right) view of the display screen, and FIG. 23(d) is a three-dimensional view of the display screen.

Figure 24:
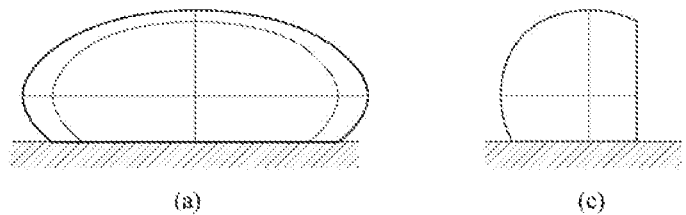
FIG. 24 is a schematic view of a partially-enclosed display screen with a bottom portion and a. rear portion being both "cut" corresponding to FIG. 6 according to an embodiment of the present application.
Figure 24:
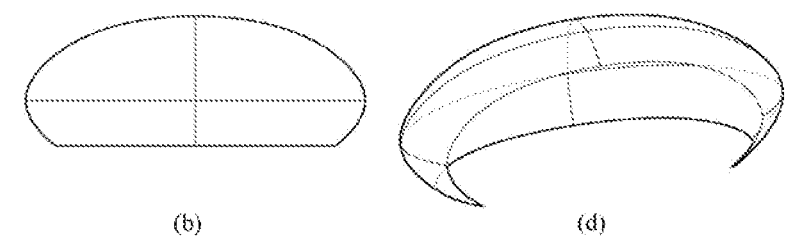

In another embodiment, referring to FIG. 24, FIG. 24 illustrates a display screen in FIG. 6 with a bottom portion and a rear portion being both "cut". FIG. 24(a) is a front view of the display screen, FIG. 24(b) is a top view of the display screen, FIG. 24(c) is a left (or right) view of the display screen, and FIG. 24(d) is a three-dimensional view of the display screen.

Figure 25:
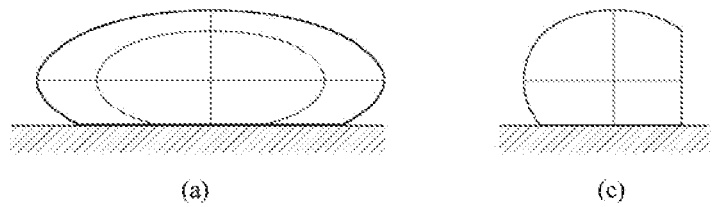
FIG. 25 is a schematic view of a partially-enclosed display screen with a bottom portion and a. rear portion being both "cut" corresponding to FIG. 7 according to an embodiment of the present application.
Figure 25:
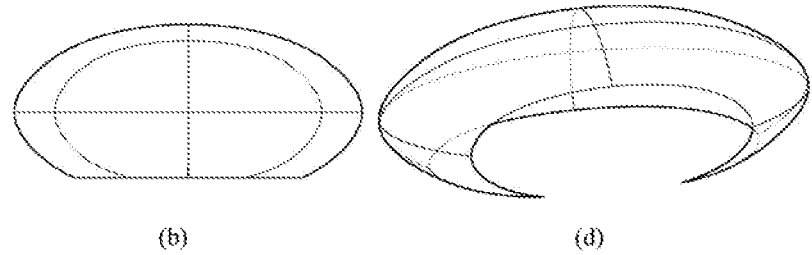

In another embodiment, referring to FIG. 25, FIG. 25 illustrates a display screen in FIG. 7 with a bottom portion and a rear portion being both "cut". FIG. 25(a) is a front view of the display screen, FIG. 25(b) is a top view of the display screen, FIG. 25(c) is a left (or right) view of the display screen, and FIG. 25(d) is a three-dimensional view of the display screen.

The present application sets no limitation to the specifically "cut" bottom portion and rear portion of the display screen. In practice, the portion to be cut may be determined according to the size and position of the seat platform of the audiences, the size of the display screen and the like, as long as the audiences are capable of normally watching the display images and achieving the sense of no boundary. Preferably, it needs to be at least ensured that the audiences in the first row are capable of watching the display screen from the uppermost part and the lowermost part in the sight line when the audiences watching from a front elevation. Generally, the upper boundary of the vertical vision field of the eyes of the audiences is 50 degrees above the eye level, and the lower boundary is 70 degrees below the eye level.

The embodiments as illustrated in FIG. 1 to FIG. 25 all employ a symmetrical structure in the horizontal direction. In practice, an unsymmetrical structure may also be employed. For example, the housing structure has only one end portion.

Figure 26:
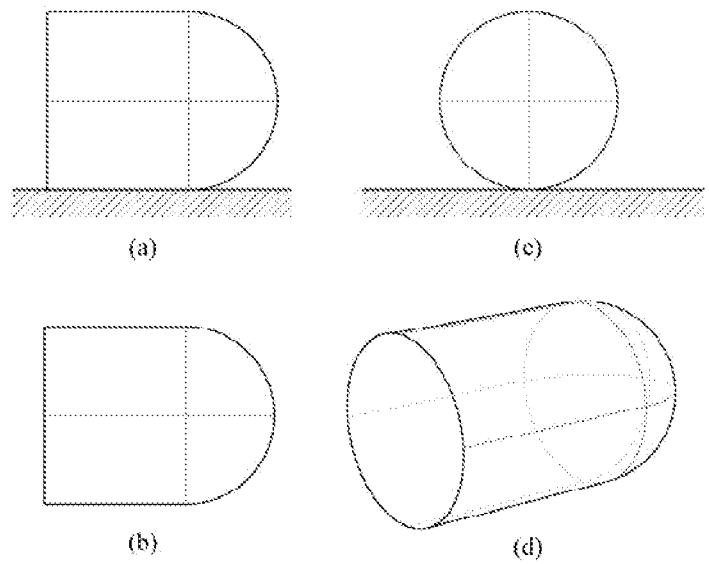
FIG. 26 is a schematic view of a partially-enclosed display screen with an end portion being "cut" corresponding to FIG. 2 according to an embodiment of the present application.

In one embodiment, referring to FIG. 26, FIG. 26 illustrates a display screen in FIG. 2 with an end portion being "cut". FIG. 26(a) is a front view of the display screen, FIG. 26(b) is a top view of the display screen, FIG. 26(c) is a left (or right) view of the display screen, and FIG. 26(d) is a three-dimensional view of the display screen.

Figure 27:
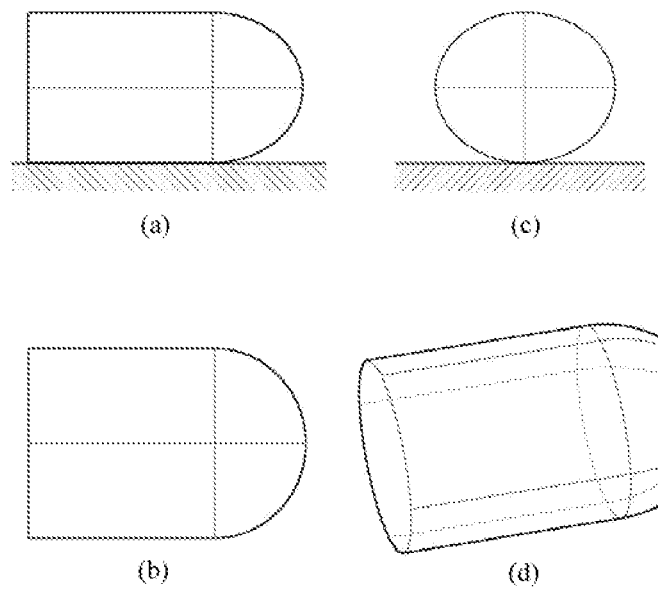
FIG. 27 is a schematic view of a partially-enclosed display screen with an end. portion being "cut" corresponding to FIG. 3 according to an embodiment of the present application.

In another embodiment, referring to FIG. 27, FIG. 27 illustrates a display screen in FIG. 3 with an end portion being "cut". FIG. 27(a) is a front view of the display screen, FIG. 27(b) is a top view of the display screen, FIG. 27(c) is a left (or right) view of the display screen, and FIG. 27(d) is a three-dimensional view of the display screen.

Figure 28:
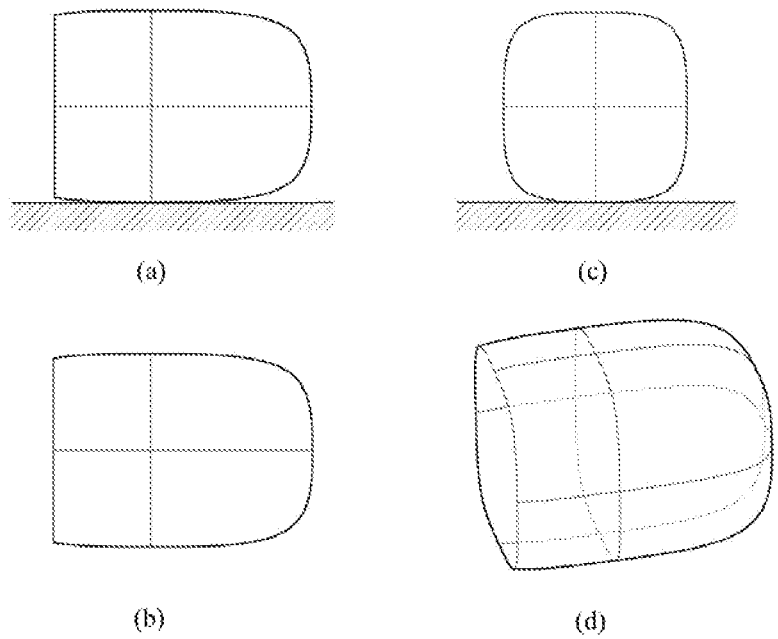
FIG. 28 is a schematic view of a partially-enclosed display screen with an end. portion being "cut" corresponding to FIG. 4 according to an embodiment of the present application.

In another embodiment, referring to FIG. 28, FIG. 28 illustrates a. display screen in FIG. 4 with an end portion being "cut". FIG. 28(a) is a front view of the display screen, FIG. 28(b) is a. top view of the display screen, FIG. 28(c) is a left (or right) view of the display screen, and. FIG. 28(d) is a three-dimensional view of the display screen.

Figure 29:
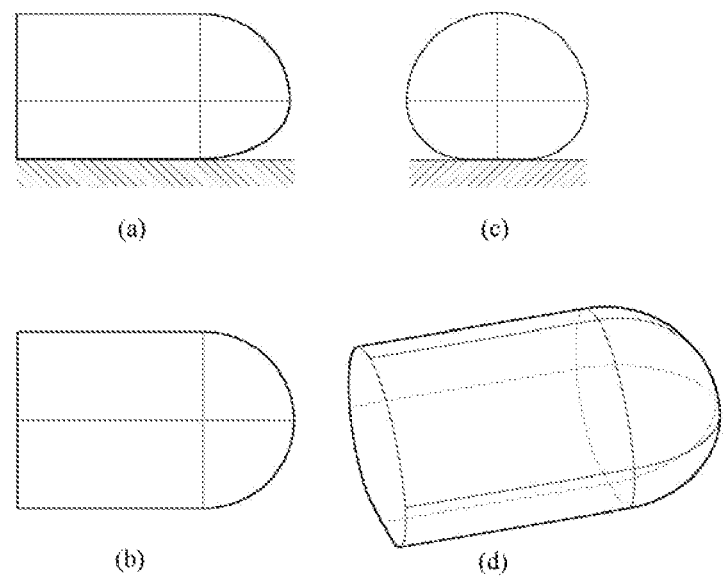
FIG. 29 is a schematic view of a partially-enclosed display screen with an end portion being "cut" corresponding to FIG. 5 according to an embodiment of the present application.

In another embodiment, referring to FIG. 29, FIG. 29 illustrates a display screen in FIG. 5 with an end portion being "cut". FIG. 29(a) is a front view of the display screen, FIG. 29(b) is a top view of the display screen, FIG. 29(c) is a left (or right) view of the display screen, and FIG. 29(d) is a three-dimensional view of the display screen.

Figure 30:
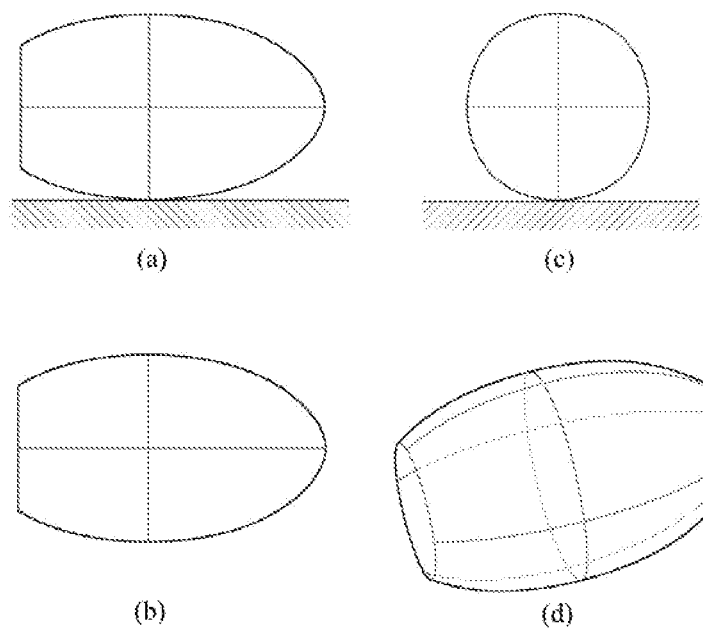
FIG. 30 is a schematic view of a partially-enclosed display screen with an end portion being "cut" corresponding to FIG. 6 according to an embodiment of the present application.

In another embodiment, referring to FIG. 30, FIG. 30 illustrates a display screen in FIG. 6 with an end portion being "cut". FIG. 30(a) is a front view of the display screen, FIG. 30(b) is a top view of the display screen. FIG. 30(c) is a left (or right) view of the display screen, and. FIG. 30(d) is a three-dimensional view of the display screen.

Figure 31:
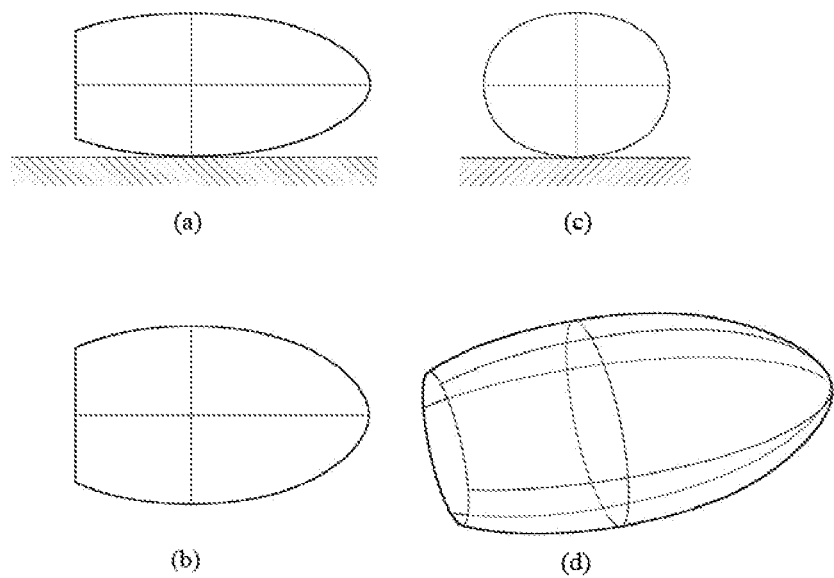
FIG. 31 is a schematic view of a partially-enclosed display screen with an end portion being "cut" corresponding to FIG. 7 according to an embodiment of the present application.

In another embodiment, referring to FIG. 31, FIG. 31 illustrates a display screen in FIG. 7 with an end portion being "cut". FIG. 31(a) is a front view of the display screen, FIG. 31(b) is a top view of the display screen, FIG. 3 1(c) is a left (or right) view of the display screen, and FIG. 31(d) is a three-dimensional view of the display screen.

In the embodiments as illustrated in FIG. 26 to FIG. 31, the housing structure has only one end portion. To further save the cost, when the housing structure has only one end portion, the bottom portion of the housing structure may be "cut".

Figure 32:
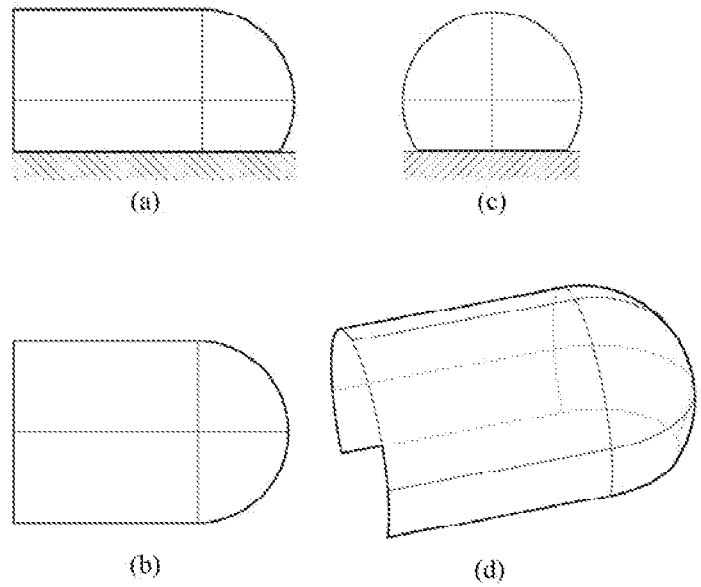
FIG. 32 is a schematic view of a partially-enclosed display screen with an end portion and a bottom portion being "cut" corresponding to FIG. 2 according to an embodiment of the present application.

In one embodiment, referring to FIG. 32, FIG. 32 illustrates a display screen in FIG. 2 with an end portion and a bottom portion being both "cut". FIG. 32(a) is a front view of the display screen, FIG. 32(b) is a top view of the display screen, FIG. 32(c) is a left (or right) view of the display screen, and FIG. 32(d) is a three-dimensional view of the display screen.

Figure 33:
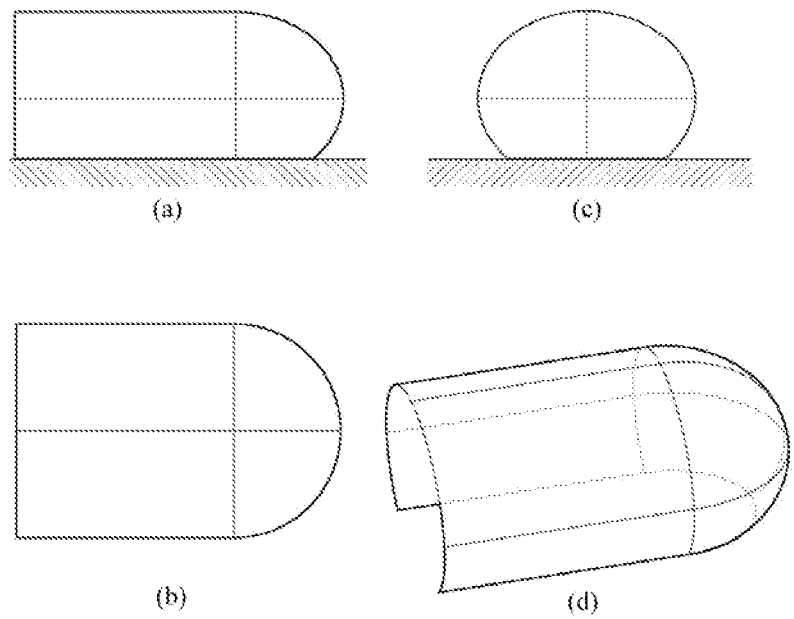
FIG. 33 is a schematic view of a partially-enclosed display screen with an end portion and a bottom portion being both "cut" corresponding to FIG. 3 according to an embodiment of the present application.

In another embodiment, referring to FIG. 33, FIG. 33 illustrates a display screen in FIG. 3 with an end portion and a bottom portion being both "cut". FIG. 33(a) is a front view of the display screen, FIG. 33(b) is a top view of the display screen, FIG. 33(c) is a left (or right) view of the display screen, and FIG. 33(d) is a three-dimensional view of the display screen.

Figure 34:
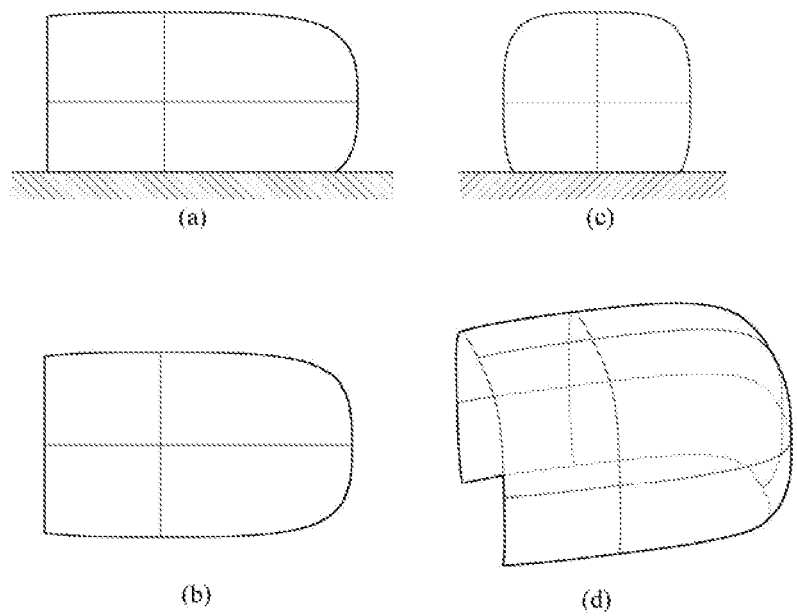
FIG. 34 is a schematic view of a partially-enclosed display screen with an end portion and a bottom portion being "cut" corresponding to FIG. 4 according to an embodiment of the present application.

In another embodiment, referring to FIG. 34, FIG. 34 illustrates a display screen in FIG. 4 with an end portion and a bottom portion being both "cut". FIG. 34(a) is a front view of the display screen, FIG. 34(b) is a top view of the display screen, FIG. 34(c) is a left (or right) view of the display screen, and FIG. 34(d) is a three-dimensional view of the display screen.

Figure 35:
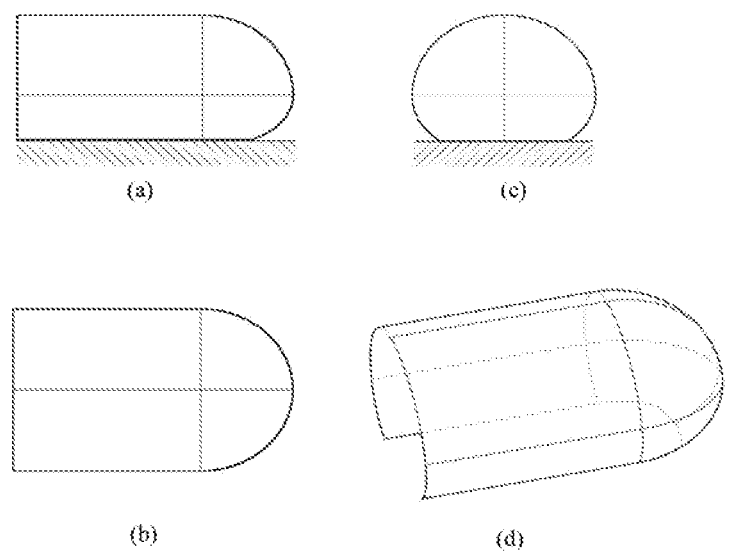
FIG. 35 is a schematic view of a partially-enclosed display screen with an end portion and a bottom portion being both "cut" corresponding to FIG. 5 according to an embodiment of the present application.

In another embodiment, referring to FIG. 35, FIG. 35 illustrates a display screen in FIG. 5 with an end portion and a bottom portion being both "cut". FIG. 35(a) is a front view of the display screen, FIG. 35(b) is a top view of the display screen, FIG. 35(c) is a left (or right) view of the display screen, and FIG. 35(d) is a three-dimensional view of the display screen.

Figure 36:
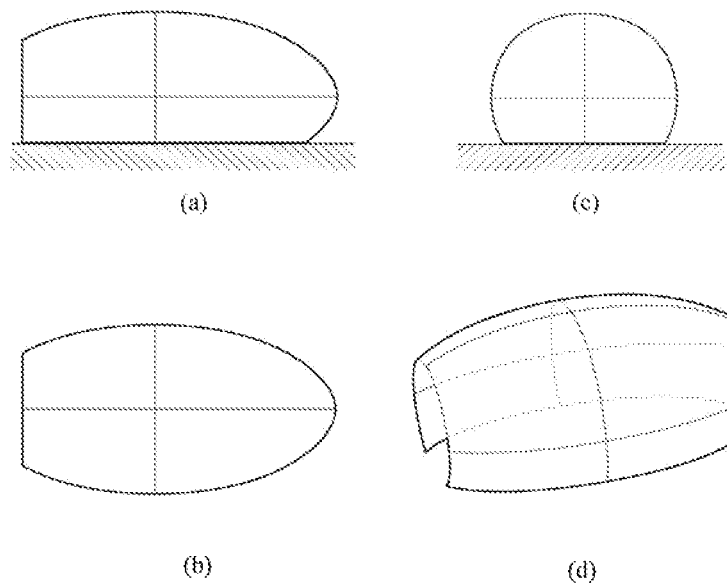
FIG. 36 is a schematic view of a partially-enclosed display screen with an end portion and a bottom portion being both "cut" corresponding to FIG. 6 according to an embodiment of the present application.

In another embodiment, referring to FIG. 36, FIG. 36 illustrates a display screen in FIG. 6 with an end portion and a bottom portion being both "cut". FIG. 36(a) is a front view of the display screen, FIG. 36(b) is a top view of the display screen, FIG. 36(c) is a left (or right) view of the display screen, and FIG. 36(d) is a three-dimensional view of the display screen.

Figure 37:
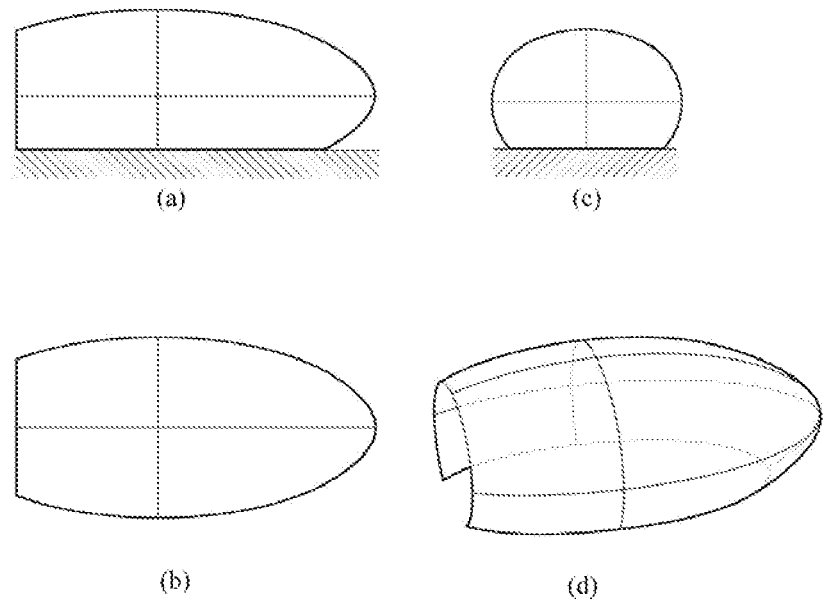
FIG. 37 is a schematic view of a partially-enclosed display screen with an end portion and a bottom portion being both "cut" corresponding to FIG. 7 according to an embodiment of the present application.

In another embodiment, referring to FIG. 37, FIG. 37 illustrates a display screen in FIG. 7 with an end portion and a bottom portion being both "cut". FIG. 37(a) is a front view of the display screen, FIG. 37(b) is a top view of the display screen, FIG. 37(c) is a left (or right) view of the display screen, and FIG. 37(d) is a three-dimensional view of the display screen. The present application sets no limitation to the specifically "cut" bottom portion of the display screen when the display screen has only one end portion. In practice, the portion to be cut may be determined according to the size and position of the seat platform of the audiences, the size of the display screen and the like, as long as the audiences are capable of normally watching the display images and achieving the sense of no boundary. Preferably, it needs to be at least ensured that the audiences in the first row are capable of watching the display screen from the lowermost part in the sight line when the audiences watching from a front elevation. Generally, the lower boundary of the vertical vision field of the eyes of the audiences is 70 degrees below the eye level.

In addition, the display screen according to the present application may be a self-luminescent display screen, for example, a light-emitting diode (LED) dot matrix screen or an organic light-emitting diode (OLED) dot matrix display or the like. Further, the display screen may also be a projection display screen or another type of display screen, which is not specifically limited in the present application.

The display screen may be configured to display a planar image or may be configured to display a three-dimensional image.

Described above are specific embodiments of the present application. It should be noted that persons of ordinary skill in the art may derive other improvements or polishments without departing from the principles of the present application. Such improvements and polishments shall be deemed as falling within the protection scope of the present application.

What is claimed is:

1. A display screen, wherein the display screen is in a fully-closed or partially-closed housing structure, an interior of the housing structure is configured to provide continuous images with a view angle of 180 degrees to 360 degrees in a horizontal direction;
    wherein the housing structure comprises a cylindrical portion and an end portion that is connected with the cylindrical portion, a side wall of the cylindrical portion is arranged in a straight line in a horizontal cross section, the cylindrical portion has a substantially rectangular horizontal cross section and the end portion has a horizontal cross section in the shape of an arc.

2. The display screen according to claim 1, wherein the cylindrical portion has a vertical cross section of a circle, a portion of a circle, an ellipse, or a quadrangle with rounded corners.

3. The display screen according to claim 2, wherein the vertical cross section of the cylindrical portion is a quadrangle with rounded corners, and the quadrangle is rectangular.

4. The display screen according to claim 2, wherein:
    the housing structure has one end portion, and the end portion is connected to one end of the cylindrical portion in a smooth transition manner; or
    the housing structure has two end portions, and the two end portions are respectively connected to two ends of the cylindrical portion in a smooth transition manner.

5. The display screen according to claim 4, wherein the cylindrical portion is integratable with or detachable from the end portion.

6. The display screen according to claim 4, wherein the vertical cross section of the cylindrical portion is a circle, and the end portion is a semispherical structure.

7. The display screen according to claim 1, wherein the display screen comprises a self-luminous display screen or a projection display screen.

8. The display screen according to claim 1, wherein the display screen is configured to display a planar image or a three-dimensional image.

* * * * *